United States Patent Office 3,022,268
Patented Feb. 20, 1962

3,022,268
POLYETHYLENE COMPOSITION
John Brian Armitage and Archibald Miller Hyson, Wilmington, Del., assignors to E. I. du Pont de Nemours and Company, Wilmington, Del., a corporation of Delaware
No Drawing. Filed July 17, 1958, Ser. No. 749,055
2 Claims. (Cl. 260—45.85)

This invention relates to plastic compositions of matter, and more particularly to polyethylene compositions and to articles made therefrom having improved properties with respect to resistance to light, especially in the ultra violet (U.V.) range (2900–3600 A.).

Over a period of years, considerable research attention has been directed to developing an effective, non-discoloring U.V. stabilizer for the polymers of ethylene. Many initially promising leads have been investigated with discouragingly frequent failures. Moreover, neither commercial products, literature nor patents reveal that a wholly satisfactory adjuvant had been found, prior to this invention. While it is true that salicylate derivatives have long been known as U.V. absorbers and have been employed as light stabilizers for various plastics, none have heretofore been sufficiently effective to justify their use in polyethylene compositions. Methyl and butyl salicylates have been used in vinyl resins, U.S. Patent 2,126,179 (F. W. Duggan, issued Aug. 9, 1938); metal salicylates in vinyl chlorides, U.S. Patent 2,438,102 (F. W. Cox et al. issued Mar. 16, 1948); phenyl salicylates in halogenated polyethylenes, Br. Patent 538,871 (D. Whittaker, issued Aug. 20, 1941); and mono- or disalicylate of 2,2-diphenylol propane in halogenated butadiene polymers, U.S. Patent 2,537,639 (E. P. Stefl et al., issued Jan. 9, 1951).

It has been postulated that the hydroxyl and carbonyl groups on adjacent carbon atoms in the benzene ring, in organic compounds containing the salicylate nucleus, undergo hydrogen bonding to form a six-membered chelate ring. This configuration possesses exceptionally high resonance stability and greatly increased U.V. absorptive properties. Previously known stabilizers of this type, however, are not compatible with the purely aliphatic hydrocarbon polymers, such as polyethylene. After incorporating phenyl salicylate or salicylanilide, for example, into polyethylene by milling at elevated temperatures, on cooling, such stabilizers exude to the surface and are lost mechanically. When a low boiling ester of salicylic acid is employed it is lost by volatilization. This invention relates to the use of compounds containing a salicylate nucleus which are made compatible with the olefines and which are retained in plastic compositions containing the polyolefines.

An object of this invention is to provide plastic compositions, normally based on solid polyolefines, which are resistant to discoloration when exposed to ultra violet light. Another object is to provide compositions of such polymeric materials stabilized against such exposure. Another object is to provide such compositions having increased stability performance. Yet another object of the invention is to provide compositions of polyethylene containing compatible compounds having a salicylate nucleus. Still another object is the substantial retardation of degradation of polyolefine compositions by ultra violet light through the use of compositions containing a salicylate nucleus that is non-migrating, non-volatile in character and remains permanently associated with the polyolefine. Other objects and advantages of the invention will hereinafter appear.

This invention relates to the use of compounds containing a salicylate nucleus which has been made compatible with branched and/or linear polyolefines by attaching a long hydrocarbon chain substituent to the nucleus. To effect compatibility, the long hydrocarbon chain or chains are attached to salicylate nuclei and related nuclei having these chemical structures:

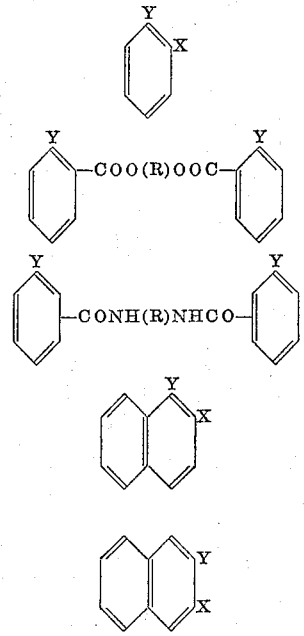

in which X is a $COOR_1$, $CONHR_1$ or $CONR_1R_2$ substituent; Y is an OH, $NH_2$, SH, or $OR_3$ substituent; R is an alkylene group containing 4 to 10 carbon atoms; $R_1$ and $R_2$ are similar or dissimilar alkyl groups containing 8 to 32 carbon atoms; and $R_3$ is an alkyl group containing 1 to 4 carbon atoms. Especially effective as polyolefine light stabilizers are the series of esters, prepared from salicylic acid and $C_8$ to $C_{18}$ alcohols or from $C_4$ to $C_{10}$ terminal glycols, the resulting esters ranging from liquid to solid, colorless products. These polyolefine stabilizers can be incorporated into polyolefines and are effective in amounts up to about 1% by weight of the polyolefine without exudation ("blooming") occurring even after extended periods of time.

General methods for preparing the salicylate esters are described by McMillan and King, J.A.C.S., 67, 2271 (1945). Methods for the preparation of the other compounds are described hereinafter.

The polyolefine constituents of the plastic U.V. stabilized composition of the invention include the conventional normally solid branched chain polyethylenes; the linear polyethylenes, such as are prepared by any suitable process such, for example, as the processes of the Larchar and Pease U.S. Patent 2,816,883, issued Dec. 17, 1957; and the Pease and Roedel U.S. Patent 2,762,791, issued Sept. 11, 1956; and the polyolefines of alkenes of higher molecular weight than ethylene, such as propene, butene, pentene, etc. The compounds containing the salicylate nucleus of the invention likewise markedly improve the resistance of copolymers of the above olefines or copolymers of the above olefines with other polymerizable organic compounds.

The salicylate nucleus-containing adjuvants are incorporated into the polyolefine in concentrations between 0.0005% and about 1% by weight; those with the longer hydrocarbon chains are generally more compatible than those with the shorter chains. The compositions are formed by any suitable method such, for example, as working the polyolefine and the adjuvant on a rubber mill at a temperature between 140 and 170° C., dissolving the adjuvant in a suitable solvent such as acetone, hexane, and benzene, and spraying the solution into a Banbury mixer containing the polyethylene or by any other suitable method known to the art for adding small amounts of an adjuvant to polyolefines, such as the methods shown in the Latham and Strain U.S. Patent 2,434,662, issued Jan. 20, 1948.

The adjuvants of the examples given below were milled into polyethylene on a two-roll mill at 160±5° C. for 10 minutes. Films (10 mil) compression molded from these compositions were then exposed to accelerated weathering tests. Filtered light with wet and dry cycles (18 min. wet and 102 min. dry) in an Atlas Weather-Ometer was used to simulate outdoor conditions. The stabilization obtained with the salicylate adjuvants is illustrated and compared with polyethylene film containing no stabilizer of any kind and with such film containing an antioxidant, the Elmendorf Tear Test (A.S.T.M. D689–44) serving as a measure of U.V. resistance. A value of 30 g./mil or less was taken as failure.

ACCELERATED WEATHERING OF POLYETHYLENE FILMS (10 MIL)

| Adjuvant | Percent | Elmendorf Tear (g./mil) | | |
|---|---|---|---|---|
| | | Control | 500 hrs. | 1,000 hrs. |
| 1. None | | 102 | Brittle | |
| 2. 4,4'-thiobis-(6-tert-butyl-m-cresol). | 0.2 | 124 | 42 | Brittle. |
| 3. Octadecylsalicylate | 2.0 | 126 | 145 | 54. |
| 4. Octadecylsalicylate | 1.0 | 106 | 115 | 75. |
| 4,4'-thiobis-(6-tert-butyl-m-cresol) | 0.1 | | | |
| 5. 2-mercaptobenzimidazole | 2.0 | 109 | 35 | Brittle. |
| 4,4'-thiobis-(6-tert-butyl-m-cresol) | 0.1 | | | |
| 6. Octadecylsalicylate | 1.0 | 94 | 105 | 82. |
| 4,4'-thiobis-(6-tert-butyl-m-cresol) | 0.1 | | | |

It is seen from the examples that the presence of 1% octadecylsalicylate and 0.1 4,4'-thiobis-(6-tert-butyl-m-cresol) extends the life of polyethylene from about 500 hours to more than 1000 hours under the accelerated weathering conditions described. This accelerated weathering is approximately equivalent to 3 to 4 times the degradation rate of compositions subjected to exposure in Florida. No discoloration of the sample occurs under the conditions of accelerated weathering using these salicylate-type stabilizers.

The salicylates having low molecular weight hydrocarbon substituents such as the methyl, ethyl, and phenyl salicylates are, it has been found, unsuitable and ineffective as U.V. stabilizers for the polyolefines. The methyl and ethyl and like esters of the acid are quite volatile while esters such as the intermediate alkyl esters and phenyl salicylate are incompatible even when used in amounts as low as 1%. When higher molecular weight substituents are present, however, there is not only compatibility of the salicylate compound with the polyolefine but also effective U.V. stabilization of the polymer.

The long chain alkyl esters of the substituted benzoic acids may be prepared by the following or by any other suitable methods:

*Example 7.*—The methyl ester of the acid (1 mole), the alcohol (1 mole) or glycol (0.5 mole), litharge (3% by weight of reactants) and toluene (equal to weight of alcohol) are heated to reflux and a methanol-toluene azeotrope, B.P. 63° C., removed through a glass-packed Fenske column until the B.P. of the distillate rises to that of toluene. The hot solution is filtered from litharge and the product isolated by fractional distillation or crystallization.

By this method the following new compounds were prepared:

(1) 1,4-disalicyloxybutane crystallized (from alcohol) as colorless, glittering prisms, M.P. 125° C. Found: C, 65.3; H, 5.6%—$C_{18}H_{18}O_6$ requires C, 65.45; H, 5.49%.

(2) Diethyl ether di(B-salicyloxyethyl) ether (disalicylate from tetraethylene glycol). The compound distilled as a colorless viscous oil, B.P. 195°/1 min. Found: C, 61.1; H, 6.1%—$C_{22}H_{26}O_9$ requires C, 60.82; H. 6.03%.

(3) 1,10-disalicyloxydecane crystallized from alcohol as shiny plates, M.P. 77–8° C. Found: C, 69.9; H, 7.2%—$C_{24}H_{20}O_6$ requires C, 69.54; H, 7.29%.

(4) Octadecyl anthranilate crystallized from alcohol as matted needles, M.P. 55–6° C. Found: N, 3.47%—$C_{25}H_{43}NO_2$ requires N, 3.59%.

(5) Octadecyl 2-hydroxy-m-toluic acid (octadecyl o-cresotinate) crystallized (from alcohol) as small, colorless prisms, M.P. 55° C. Found: C, 77.2; H, 11.2%—$C_{26}H_{44}O_3$ requires C, 77.17; H, 10.96.

(6) Octadecyl o-methoxybenzoate crystallized from alcohol as small plates, M.P. 41–2° C. Found: C, 77.4; H, 10.9%—$C_{26}H_{44}O_3$ requires C, 77.17; H, 10.96%.

(7) Octadecyl-2-hydroxy-3-naphthalate crystallized (from alcohol) as pale yellow plates, M.P. 81–2° C. Found: C, 79.1; H, 10.1%—$C_{29}H_{44}O_3$ requires C, 79.04; H, 10.06%.

*Example 8.*—The amides of salicyclic acid were synthesized as follows:

(1) N-octadecyl salicylamide

In a 250 ml. flask fitted with an 8″ Vigreux column phenyl salicylate (21.4 g.; 0.1 mole), octadecylamine (26.9 g.; 0.1 mole) and 1,2,4'-trichlorobenzene (30 g.) are heated to boiling and phenol distilled off at 183–189° C. over a period of one hour, until the heat temperature reaches 208° C. The hot solution is then decolorized with carbon, filtered and cooled. Petroleum ether (50 ml.) is added and the solid product filtered off and recrystallized from alcohol as waxy plates, M.P. 86° C.

Found: C, 77.2; H, 11.1; N, 3.54%—$C_{25}H_{43}NO_2$ requires C, 77.1; H, 11.1; N, 3.60%.

(2) N,N'-disalicyl-1,6-diaminohexane (Salicyldiamide from hexamethylene diamine)
(N,N'-thiomethylenedisalicylamide)

By the above procedure using phenyl salicylate (36.4 g), hexamethylene diamine (9.3 g.) and 1,2,4'-trichlorobenzene (30 g.) the product was isolated and crystallized from aqueous alcohol as small plates, M.P. 142° C.

Found: C, 66.9; H, 6.7; N, 7.73—$C_{20}H_{24}N_2O_4$ requires C, 67.5; H, 6.7; N, 7.8%.

It had been considered, by research associates working with the inventor, that the U.V. high screening effect of a salicylate nucleus would be reduced by increasing the non-salicylate moiety of the compound. Consequently, to increase the latter moiety to an extent sufficient to render the compound compatible would result, it was thought, in a compound of no value as a U.V. stabilizer. Contrary to this reasoning, the compositions of the invention were found to be markedly resistant to U.V. light with 1% or less of the highly substituted salicylate nucleus.

Particularly effective compounds containing the salicylate nuclei, which compounds are modified sufficiently by a substituent group to render them compatible with polyethylene, include octadecyl salicylate, octadecyl o-cresotinate (1), and octadecyl 2-hydroxy-3-naphthoate, dodecyl salicylate

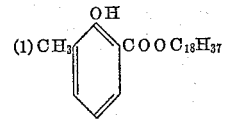

Heat stabilizing agents, other than 4,4'-thiobis(6-tert-butyl-m-cresol), that are especially effective in conjoint use with the aforesaid and equivalent salicylates when employed in amounts ranging between 0.001 to 0.5% by weight of the polyethylene, include: N-(p-hydrophenyl)- morpholine, tri-tert-butyl-p-phenylphenol, 4,4'-butylidenebis - (6 - tert-butyl-m-cresol), and 2,2' - methylenebis(4-methyl-6-tert-butyl phenol).

The polyethylene compositions of the invention are useful in all applications where the unstabilized light-sensitive polymers are useful. They are, moreover, of special utility in shaped objects (e.g., filaments, films, sheets, coatings, moldings) made of these compositions which in use are exposed to light rich in radiations in the ultra violet range.

We claim:

1. A light-resistant composition containing polyethylene and 0.0005% to 1% by weight of the polyethylene content of the composition of octadecylsalicylate and from 0.0005% to 1% on the same basis of 4,4'-thiobis-(6-tert-butyl-m-cresol).

2. A film containing a composition of claim 1.

References Cited in the file of this patent

UNITED STATES PATENTS

| 2,448,799 | Happoldt et al. | Sept. 7, 1948 |
| 2,732,366 | Tubbs et al. | Jan. 24, 1956 |
| 2,910,454 | Clark et al. | Oct. 27, 1959 |

FOREIGN PATENTS

| 772,938 | Great Britain | Apr. 17, 1957 |
| 779,360 | Great Britain | July 17, 1957 |

UNITED STATES PATENT OFFICE
CERTIFICATE OF CORRECTION

Patent No. 3,022,268                        February 20, 1962

John Brian Armitage et al.

It is hereby certified that error appears in the above numbered patent requiring correction and that the said Letters Patent should read as corrected below.

Column 3, line 41, for "0.1" read -- 0.1% --; column 4, line 9, for "$C_{24}H_{20}O_6$" read -- $C_{24}H_{30}O_6$ --; line 75, for "N-(p-hydrophenyl)-" read -- N-(p-hydroxyphenyl)- --.

Signed and sealed this 5th day of June 1962.

(SEAL)
Attest:

ERNEST W. SWIDER                        DAVID L. LADD
Attesting Officer                        Commissioner of Patents